United States Patent
Tsukada et al.

(10) Patent No.: US 7,901,590 B2
(45) Date of Patent: Mar. 8, 2011

(54) PIEZOELECTRIC CERAMIC COMPOSITION

(75) Inventors: Takeo Tsukada, Tokyo (JP); Masahito Furukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 581 days.

(21) Appl. No.: 12/076,693

(22) Filed: Mar. 21, 2008

(65) Prior Publication Data

US 2008/0237530 A1    Oct. 2, 2008

(30) Foreign Application Priority Data

Mar. 26, 2007  (JP) ................................ 2007-080238

(51) Int. Cl.
*H01L 41/187* (2006.01)
(52) U.S. Cl. .............. 252/62.9 R; 252/62.9 PZ; 501/134
(58) Field of Classification Search ............. 252/62.9 R, 252/62.9 PZ; 501/134
See application file for complete search history.

(56) References Cited

FOREIGN PATENT DOCUMENTS

| JP | H04-60073 | 9/1992 |
|---|---|---|
| JP | H11-171643 | 6/1999 |
| JP | H11-180769 | 7/1999 |
| JP | H16-035350 | 2/2004 |
| JP | 2005-47745 | 2/2005 |
| JP | 2005-47746 | 2/2005 |
| JP | 2005-47747 | 2/2005 |
| JP | 2005-47748 | 2/2005 |

*Primary Examiner* — C. Melissa Koslow
(74) *Attorney, Agent, or Firm* — Manabu Kanesaka

(57) ABSTRACT

A piezoelectric ceramic composition that acquires excellent piezoelectric properties even when it is fired at a low temperature is offered. The piezoelectric ceramic composition possesses a composition corresponding to a solid solution that contains a first compound having a rhombohedral crystal-based perovskite structure, a second compound having a tetragonal crystal-based perovskite structure, and a third compound. The third compound is a compound oxide containing Bi as a first component element, Fe or Mn as a second component element, and a hexavalent metallic element as a third component element. The hexavalent metallic element is at least one kind selected from W and Mo.

7 Claims, No Drawings

US 7,901,590 B2

PIEZOELECTRIC CERAMIC COMPOSITION

BACKGROUND OF THE INVENTION

1. Field of the Invention

This invention relates to a piezoelectric ceramic composition that is widely utilized in the field of actuators, sensors, resonators, and the like.

2. Description of the Related Art

The piezoelectric materials (piezoelectric ceramic compositions) possess an effect of generating strain when an electric field is applied thereto from outside (conversion of electric energy to mechanical energy) and an effect of generating an electric charge on the surface thereof when stress is applied thereto from outside (conversion of mechanical energy to electric energy) and have been widely utilized in various fields in recent years. Such a piezoelectric material as lead titanate zirconate ($Pb(Zr, Ti)O_3$: PZT) excels in minute positional justification and finds utilization as in optical minute justification because it generates strain substantially proportional to the order of $1 \times 10^{-10}$ m/V in response to an applied voltage. In contrast thereto, the piezoelectric material is utilized also as a sensor for reading out minute force and deformation because it generates a large electric charge in proportion to the stress exerted thereon or the amount of deformation of itself caused by the stress. Further, since the piezoelectric material possesses excellent responsiveness, it is capable of enabling the piezoelectric material itself or an elastic body adapted for union with the piezoelectric material to be excited and consequently allowed to induce resonation therewith and, therefore, is utilized as a piezoelectric transformer, a supersonic motor, etc.

Most piezoelectric materials now available for practical applications are solid solution systems (PZT systems) consisting of $PbZrO_3$(PZ)-$PbTiO_3$(PT). The reason for this fact is that excellent piezoelectric properties can be obtained by using a composition nearing the morphotropic phase boundary (M. P. B.) between the rhombohedral crystal-based PZ and the tetragonal crystal-based PT. The PZT-based piezoelectric materials that are adapted to suit various uses in consequence of the addition of a varying auxiliary component or additive have been developed widely. They are varied to such an extent of embracing use as an actuator for positional justification requiring a large voltage coefficient (d) instead of manifesting a small mechanical factor of merit (Qm) and expected to produce a large displacement in the application using direct current and use as a supersonic wave generating device like a supersonic motor possessing a large mechanical factor of merit (Qm) instead of manifesting a small piezoelectric constant (d) and suiting the way of using an alternating current.

Also other piezoelectric materials than the PZT-based materials have been developed for practical applications. They are mostly solid solutions that have as main components such lead-based perovskite compositions as lead magnate niobate [$Pb(Mg, Nb)O_3$:; PMN).

The piezoelectric materials developed for practical applications are invariably lead-based piezoelectric materials as described above and have lead oxide (PbO) extremely rich in volatility even at low temperatures contained as a main component in a large amount nearing 60 to 70 mass %. PZT or PMN, for example, contains lead oxide in an amount of about ⅔ in mass ratio. The lead-based piezoelectric materials that contain lead in such a large amount entail many problems in terms of environmental resistance like public nuisance and from the ecological point of view. During the manufacture of a lead-based piezoelectric material, for example, an extremely large amount on the industrial level of lead oxide is suffered to volatilize and diffuse into the air in the step of a thermal treatment such as firing when the products are ceramic articles or melting when the products are single crystal articles. Though the lead oxide emitted in the step of manufacture may be recovered, the lead oxide contained in piezoelectric products marketed as commercial articles is difficult of recovery in the present situation. When this lead oxide is widely released in the environment, the elution of lead caused by acid rain arouses anxiety. In consideration of the growth of the amounts of their application, therefore, the liberation of lead from the piezoelectric materials proves to constitute an extremely important problem.

As piezoelectric materials that contain absolutely no lead, barium titanate ($BaTiO_3$) and bismuth-bedded ferroelectric materials have been known. The barium titanate, however, is devoid of serviceability in view of applications that involve joining with solder and mounting on a vehicle because it has such a low Curie point as 120° C. and suffers loss of piezoelectricity at a temperature exceeding it. On the other hand, the bismuth-bedded ferroelectric materials, though usually possessing a Curie point exceeding 400° C. and excelling in thermal stability, entail the problem in terms of productivity because it possesses large crystal anisotropy and requires spontaneous polarization to be oriented as by hot forging. Generally, the elimination of lead in a piezoelectric material leads to degradation of piezoelectric property. When the lead content is thoroughly eliminated from the conventional piezoelectric material, for example, it is judged that large piezoelectricity is obtained with difficulty.

Further, in search of a new piezoelectric material, studies have been being promoted on the sodium bismuth titanate-based materials in recent years. JP-B-4-60073 and JP-A-11-180769, for example, disclose materials that contain sodium bismuth titanate and barium titanate and JP-A-11-171643 discloses materials that contain sodium bismuth titanate and potassium bismuth titanate. Then, JP-A-16-035350 discloses systems that contain sodium bismuth titanate, potassium bismuth titanate, and a third component.

These sodium bismuth titanate-based materials, however, have failed to acquire adequate piezoelectric properties as compared with lead-based piezoelectric materials and consequently are required to attain further improvements in the piezoelectric properties in the factual state of affairs. In this situation, the present patent applicant has proposed a piezoelectric ceramic material that contains a first compound possessing a rhombohedral crystal-based perovskite structure, a second compound possessing a tetragonal crystal-based perovskite structure, and a third compound including bismuth (Bi), a divalent metallic element such as manganese (Mg), a tetravalent metallic element such as zirconium (Zr), and oxygen (O) (refer to JP-A-2005-47745, JP-A-2005-47746, JP-A-2005-47748). He has also proposed a piezoelectric ceramic article that contains a first compound possessing a rhombohedral crystal-based perovskite structure, a second compound possessing a tetragonal crystal-based perovskite structure, and a third compound including bismuth, iron (Fe), a pentavalent metallic element like tantalum (Ta), and oxygen (O) (refer to JP-A2005-47747). The piezoelectric ceramic articles disclosed in Patent JP-A-2005-47745, JP-A-2005-47746, JP-A-2005-47748, and JP-A2005-47747 are capable of amply improving such piezoelectric properties as displacement and copiously enhancing the applicability of a non-lead-based piezoelectric material.

Incidentally, the piezoelectric material is required to possess a large piezoelectric constant (d) and a large displacement and meantime required to allow firing to proceed at a low temperature. When a piezoelectric device is formed with a piezoelectric ceramic composition, the formation of an electrode is necessary. The firing at a low temperature, however, is indispensable when this electrode is formed with such an inexpensive electrode material as Ag in the place of an expensive noble metal. From this point of view, the non-lead-based piezoelectric materials disclosed in the aforementioned patent documents are inadequate and hardly realize excellent piezoelectric properties when the firing is carried out at a low temperature.

SUMMARY OF THE INVENTION

This invention has been proposed in view of the conventional state of affairs mentioned above and is aimed at providing a piezoelectric ceramic composition that is capable of realizing excellent piezoelectric compositions even by firing at a low temperature.

With a view to accomplishing the object mentioned above, the piezoelectric ceramic composition of this invention is characterized by containing elements constituting a composition equivalent to a solid solution that is composed of a first compound possessing a rhombohedral crystal-based perovskite structure, a second compound possessing a tetragonal crystal-based perovskite structure, and a third compound, which is a compound oxide containing Bi as a first component element, at least one kind selected from Fe and Mn as a second component element, and a hexavalent metallic element as a third component element.

The aforementioned elements contained in the piezoelectric ceramic composition of this invention corresponds to what results from adding to the combination of the first compound possessing a rhombohedral crystal-based perovskite structure and the second compound possessing a tetragonal crystal-based perovskite structure, as the third compound, a compound oxide containing Bi as a first component element, at least one kind selected from Fe and Mn as a second element, and a hexavalent metallic element as a third component element. The addition of this compound oxide contributes to allow firing to proceed at a low temperature and realizes excellent piezoelectric properties even when the firing is carried out at a low temperature.

According to this invention, it is made feasible to realize a piezoelectric ceramic composition of a large piezoelectric constant even when the firing is carried out at a low temperature and provide a piezoelectric device of a large displacement. Further, according to this invention, since even non-lead-based piezoelectric materials are enabled to acquire adequate piezoelectric properties and moreover since the emission of lead into the environment can be repressed to a minimum even in this case, it is made feasible to realize a piezoelectric ceramic composition excelling in terms of low air pollution and environmental resistance and from the ecological point of view and promote further actual utilization of piezoelectric materials.

DESCRIPTION OF THE PREFERRED EMBODIMENT(S)

Now, the mode of embodiment that has applied this invention will be described in detail below.

The piezoelectric ceramic composition of this invention has as its basic composition a composition that corresponds to the combination of a first compound possessing a rhombohedral crystal-based perovskite structure and a second compound possessing a tetragonal crystal-based perovskite structure. By having the composition corresponding to the combination mentioned above serve as the basic composition, a morphotropic phase boundary (M. P. B.) is formed in at least part of the piezoelectric ceramic composition and excellent piezoelectric properties are realized.

Here, the first compound is required to possess a rhombohedral crystal-based perovskite structure, which may be selected in accordance with the principle that the crystal structure of a compound is decided by the composition of the compound. The question whether the compound possesses the rhombohedral crystal-based structure or not can be solved by subjecting the compound to X-ray diffraction analysis and trying the results of this analysis based on the ASTM card.

As concrete examples of the first compound, sodium bismuth titanate ($Na_{0.5}Bi_{0.5}TiO_3$), lead zirconate ($PbZrO_3$), bismuth ferrite ($BiFeO_3$), and such compounds as $Pb(Sc_{1/2}Nb_{1/2})O_3$, $Pb(Fe_{1/2}Nb_{1/2})O_3$, $Pb(Fe_{1/2}Ta_{1/2})O_3$, and $Pb(Zn_{1/3}Nb_{2/3})O_3$ may be cited. Since the first compound is preferred to be a compound containing no lead for the sake of manufacturing a non-lead-based piezoelectric material, however, the aforementioned sodium bismuth titanate (NBT) may be called a suitable compound as the third compound.

The sodium bismuth titanate is a compound that has sodium (Na) and bismuth (Bi) positioned at the A site of the perovskite structure and titanium (Ti) positioned at the B site of the perovskite structure. In the sodium bismuth titanate, the molar ratio of the A site element (Na, Bi) to the B site element (Ti) (hereinafter referred to as A/B ratio) is 1 in the stoichiometric composition. This A/B ratio is not limitative but allows a certain amount of deviation. When the sodium bismuth titanate is expressed by a general formula $(Na_{0.5}Bi_{0.5})_aTiO_3$ (wherein a denotes the A/B ratio), for example, the A/B ratio a that is not more than 1 proves favorable because it allows addition to the sintering property and enables acquisition of higher piezoelectric properties. Further, the A/B ratio that is in the range between not less than 0.85 and not more than 1.0 proves more favorable because it enables acquisition of still higher piezoelectric properties. Incidentally, the molar ratios of sodium and bismuth and the molar ratio of oxygen in the aforementioned general formula are based on the stoichiometric composition. These molar ratios allow a certain amount of deviation from the stoichiometric composition.

The first compound may be formed of one kind of compound and may be also formed of a plurality of kinds of compound. When it is formed of a plurality of kinds of compound, these compounds may or may not constitute a mutual solid solution. When it is formed of a plurality of kinds of compound, the aforementioned A/B ratios of the individual compounds are preferred to be not more than 1 and to be in the range between not less than 0.85 and not more than 1 and the values of the A/B ratios of the individual compounds obtained by arithmetic mean based on the composition are preferred to be not more than 1 and to be in the range between not less than 0.85 and not more than 1.0.

Meanwhile, the second compound is a compound that possesses a tetragonal crystal-based perovskite structure. Since the crystal structure of a compound is decided by the composition of the compound as described above, the compound possessing the tetragonal crystal-based perovskite structure may be selected based on this principle. The question whether the second compound possesses the tetragonal crystal-based perovskite structure or not can be solved similarly to the case of the rhombohedral crystal-based structure by subjecting a given compound to X-ray diffraction analysis and trying the results of the analysis based on the ASTM card.

As concrete examples of the second compound, potassium bismuth titanate ($K_{0.5}Bi_{0.5}TiO_3$), barium titanate ($BaTiO_3$), lead titanate ($PbTiO_3$), and such compounds as $Pb(Mg_{1/3}Nb_{2/}$ $_3)O_3$, $K_3Li_2Nb_5O_{15}$, and $Sr_2KNb_5O_{15}$ may be cited. When the compounds as a rhombohedral crystal-based perovskite structure has the length of the A-axis and the length of the B-axis approximate each other, it may be regarded as a compound possessing the aforementioned tetragonal crystal-based perovskite and used as such.

Among these compounds, it is favorable to use potassium bismuth titanate (KBT) or barium titanate or the combination of potassium bismuth titanate (KBT) and barium titanate. The potassium bismuth titanate and the barium titanate are compounds containing no lead and are capable of stripping a piezoelectric ceramic composition of lead and, therefore, prove favorable from the standpoint of characteristic properties.

The aforementioned potassium bismuth titanate (KBT) is a compound that has potassium (K) and bismuth (Bi) positioned at the A site of a perovskite structure and titanium (Ti) positioned at the b site of the perovskite structure. While the molar ratios of the A site elements (K and Bi) to the B site element (Ti) in the potassium bismuth titanate (A/B ratios) are 1 in the stoichiometric composition, they are not limitative but allow a certain amount of deviation. When the potassium bismuth titanate is expressed by a general formula $(K_{0.5}Bi_{0.5})_b TiO_3$ (wherein b denotes A/B ratio), the A/B ratio that is not more than 1 proves favorable because it is capable of exalting the sintering property and acquiring high piezoelectric properties. The A/B ratio that is in the range between not less than 0.85 and not more than 1.0 proves more favorable because it is capable of acquiring still higher piezoelectric properties. Incidentally, while the molar ratios of potassium and bismuth and the molar ratio of oxygen in the aforementioned general formula have been found from the stoichiometric composition, these molar ratios allow a certain amount of deviation from the stoichiometric composition.

The second compound may also be formed of one kind of compound or a plurality of kinds of compound. When it is formed of a plurality of kinds of compound, these compounds may or may not constitute a mutual solid solution. When the second compound is formed of a plurality of kinds of compound, the aforementioned A/B ratios of the individual compounds are preferred to be not more than 1 and further to be in the range between not less than 0.85 and not more than 1.0 or the values of the A/B ratios of the individual compounds found by the arithmetic mean based on the composition are preferred to be not more than 1 or further to be in the range between not less than 0.85 and not more than 1.0.

The piezoelectric ceramic composition of this invention is largely characterized by possessing a composition corresponding to what results from adding a third compound to the aforementioned basic composition. The third compound is a compound oxide containing Bi as a first component element, Fe or Mn as a second component element, and a hexavalent metallic element as a third component element and exists in a form constituting a solid solution with the first compound or the second compound or both. The fact that the third compound contains as its component elements such hexavalent metallic elements as W and Mo results in vastly improving such piezoelectric properties as piezoelectric constant even when the firing is carried out at a low temperature.

Of the component elements that constitute the third compound mentioned above, the second component element can be selected from Fe and Mn. Either of these elements is effective in improving the piezoelectric properties. Particularly when Mn is selected, it is capable of acquiring a supplemental effect of augmenting the Qm value. As the piezoelectric material, a material that has a large piezoelectric constant (d) and a large displacement is required while a material that manifests a large Qm (mechanical factor of merit: index of energy loss) as in applications necessitating use of an alternating current is required. As in a resonator that is driven with high frequency, for example, the fact that a piezoelectric material has a small Qm constitutes a factor for generation of heat. As in a piezoelectric device that is required to vibrate with a large amplitude, the fact that a piezoelectric material has a small Qm possibly leads to destruction of the device. When Mn is selected as a component element of the third compound, this selection results in not only improving the piezoelectric constant (d) but also improving the Qm value and realizing a piezoelectric ceramic composition possessing a large piezoelectric constant and a large Qm value.

Of the component elements that constitute the third compound, the third component element can be selected from hexavalent metallic elements. The hexavalent metallic component is at least one element selected from W and Mo.

When the third component element is a hexagonal metallic element, the composition of the aforementioned third compound is expressed by the general formula $Bi_c(M^I_{3/4}M^{II}_{1/4})$. In the foregoing general formula, $M^I$ denotes Fe or Mn and $M^{II}$ denotes a hexavalent metallic element (namely at least one element selected from W and Mo). While the molar ratio c of Bi is 1 in the stoichiometric composition, it allows a small amount of deviation. Though the molar ratios of $M^I$ (Fe or Mn) and the hexavalent metallic element $M^{II}$ and the molar ratio of oxygen are decided in the aforementioned general formula based on the stoichiometric composition, they allow a small amount of deviation similarly to Bi.

The piezoelectric ceramic composition of this invention allows its composition to be expressed as converted into the first compound, the second compound, and the third compound mentioned above. In this case, the ratio of the first compound and the second compound may be properly set as centered on the composition nearing the morphotropic phase boundary (M. P. B.) between the first compound possessing the rhombohedral crystal-based perovskite structure and the second compound possessing the tetragonal crystal-based perovskite structure.

Then, as regards the first compound and the second compound, the overall A/B ratios are preferred to be not more than 1 and furthermore to be not less than 0.85 and not more than 1. Specifically, the values of the A/B ratios of the first compound and the second compound found by arithmetic mean based on their compositions are preferred to be not more than 1 and furthermore to be in the range between not less than 0.85 and not more than 1.0. This statement is formularized by $(\alpha \cdot s_+ \beta \cdot t) \leq 1$ and furthermore by $0.85 \leq (\alpha \cdot s_+ \beta \cdot t) \leq 1$ providing the molar ratio of the first compound is denoted by $\alpha$, the molar ratio of the second compound by $\beta$, and the A/B ratio by t (wherein $\alpha + \beta = 1$). As already explained, a high sintering property and excellent piezoelectric properties can be obtained in this range.

While the amount of the third compound to be added may be properly set in consideration of characteristic properties of the compound, the specific composition including the third compound has the optimum range of this amount vary with the kind of the second compound. When potassium bismuth titanate (KBT) is used as the second compound, for example, the conditions $0.76 \leq x \leq 0.91$, $0.08 \leq y \leq 0.23$, $0 < z \leq 0.05$, and $x+y+z=1$ providing the molar ratio of the first compound is denoted by x, the molar ratio of the second compound by y, and the molar ratio of the third compound by z. When barium titanate is used as the second compound, the conditions $0.85 \leq x \leq 0.99$, $0 < y \leq 0.10$, $0 < z \leq 0.05$, and $x+y+z=1$ are preferred to be satisfied.

Outside the range mentioned above, the composition possibly parts from the morphotropic phase boundary (M. P. B.) between the first compound possessing a rhombohedral crystal-based perovskite structure and the second compound possessing a tetragonal crystal-based perovskite structure and suffers degradations of piezoelectric properties. When the molar ratio x of the first compound falls short of 0.76 and exceeds 0.91, for example, the departure from the morphotropic phase boundary (M. P. B.) formed between the first compound and the second compound results in degrading dielectric constant and piezoelectric properties. When the second compound is not contained, the piezoelectric properties are inferior because the morphotropic phase boundary (M. P. B.) is not formed. When the molar ratio of the second compound exceeds 0.23 (in the case of potassium bismuth titanate) or 0.10 (in the case of barium titanate), degradations of dielectric constant and piezoelectric properties are induced by departure from the morphotropic phase boundary (M. P. B.).

Then, the piezoelectric properties are possibly degraded when the content of the third compound departs from the aforementioned range and increases unduly. Since the conversion of the third compound into solid solution with the first component or the second component is deemed to enhance piezoelectric properties, the molar ratio z of the third compound that exceeds 0.05 results in degrading piezoelectric properties because of failure to produce solid solution, consequent formation of a heterogeneous phase, and addition to the amount thereof.

The piezoelectric ceramic composition of this invention possesses a form equivalent to a solid solution that has the first compound, the second compound, and at least part of the third compound constitute a mutual solid solution. That is, the piezoelectric ceramic composition of this invention has at least part thereof form a morphotropic phase boundary (M. P. B.) and allows the piezoelectric properties thereof to be enhanced. Particularly, since the third component including the third compound has the phase boundary (M. P. B.) formed therein, it enhances such piezoelectric properties as dielectric constant, coefficient of electromechanical coupling, and displacement as compared with a one-component system or a two-component system. The average particle diameter of crystal grains in the piezoelectric ceramic composition of this invention is 0.5 µm to 20 µm, for example.

While the piezoelectric ceramic composition of this invention may contain lead, the content of this lead is preferred to be not more than 1 mass % and further preferred to contain absolutely no lead. When the composition is made to constitute a non-lead-based material, it proves favorable in terms of low air pollution and ecological resistance and from the ecological point of view because it can repress to a minimum the volatilization of lead during the course of firing and the emission of lead into the environment after a piezoelectric part using the composition is distributed to the market and eventually discarded.

The piezoelectric ceramic composition that is configured as described above can be manufactured as follows, for example.

First, as starting raw materials, powdered raw materials of bismuth oxide ($Bi_2O_3$), sodium carbonate ($Na_2CO_3$), potassium carbonate ($K_2CO_3$), titanium oxide ($TiO_2$), iron oxide ($Fe_2O_3$), manganese carbonate ($MnCO_3$), tungsten oxide ($WO_3$), and molybdenum oxide ($MoO_3$) are prepared as occasion demands, dried thoroughly at a temperature exceeding 100° C., and then weighed in conformity to a composition aimed at. As the starting raw materials, carbonates or oxalates that are converted by firing to oxides may be used in the place of oxides and other compounds that are converted by firing to oxides may be used in the place of carbonates.

Then, the weighed starting raw materials are thoroughly mixed by means of a ball mill in an organic solvent or water for 5 hours to 20 hours, thoroughly dried, shaped by pressing, and calcined at 750° C. to 900° C. for approximately 1 to 3 hours. Subsequently, the product of this calcination is pulverized by means of a ball mill in an organic solvent or water for 5 hours ~30 hours, then dried again, made to add a binder solution, and subjected to size enlargement. Subsequent to the size enlargement, the product consequently obtained is pressed, for example, to form a block.

After the block is formed, the product of pressing is subjected to a heat treatment carried out at 400° C. to 800° C. for approximately 2 to 4 hours for the purpose of volatilizing the binder and subjected to main firing at 950° C. to 1300° C. for approximately 2 to 4 hours. The rate of temperature increase and the rate of temperature decrease during the main firing are both made to fall in the approximate range of 50° C./hour to 300° C./hour. Subsequent to the main firing, the resultant product of sintering is polished as occasion demand and consequently furnished with an electrode. It is then subjected to a polarizing treatment in silicon oil at 25° C. to 150° C. by applying an electric field of 5 MV/m to 10 MV/m for approximately 5 minutes to 1 hour. As a result, a piezoelectric ceramic formed of a piezoelectric ceramic composition is obtained and used as a piezoelectric device.

The piezoelectric ceramic composition of this invention is capable of being fired at a low temperature because it has added thereto a third compound containing such a hexavalent metallic element as W or Mo as a component element. It is capable of acquiring adequate piezoelectric properties even when the temperature of the main firing mentioned above is set near 1050° C., for example.

As described in detail above, the piezoelectric ceramic composition of this invention is capable of enhancing such piezoelectric properties as dielectric constant, coefficient of electromechanical coupling, and displacement even when it is fired at a low temperature because it has added a third compound containing such a hexavalent metallic element as W or Mo besides the first compound possessing a rhombohedral crystal-based perovskite structure and the second compound possessing a tetragonal crystal-based perovskite structure.

The piezoelectric ceramic composition of this invention is further capable of vastly augmenting the feasibleness of utility because it can maintain excellent piezoelectric properties even when it is stripped of lead. Specifically, it is enabled to provide a veritably excellent piezoelectric ceramic composition in terms of air pollution and environmental resistance and from the ecological point of view and promote extensive utility of piezoelectric ceramic compositions because it can repress to a minimum volatilization of lead during the course of firing and emission of lead into the environment after a piezoelectric part using the composition is distributed to the market and eventually discarded.

While the mode of embodiment of this invention has been described above, it goes without saying that this invention is not limited to the aforementioned mode of embodiment but allows various alterations. In the aforementioned mode of embodiment, for example, the case of exclusively containing the first compound, the second compound, and the third compound has been explained. Despite this explanation, the piezoelectric ceramic composition of this invention may contain other compound than the compounds enumerated above or other element as impurity or additive. As examples of the element, strontium (Sr), calcium (Ca), lithium (Li), zirconium (Zr), hafnium (Hf), silicon (Si), boron (B), aluminum (Al), and rare-earth elements may be cited.

In the foregoing mode of embodiment, the crystal structures of the first compound and the second compound have been also explained. So long as a composition corresponds to a solid solution that contains sodium bismuth titanate and potassium bismuth titanate illustrated above, it qualifies as a piezoelectric ceramic composition aimed at by this invention.

Now, specific working examples having applied this invention will be described below with reference to results of experiments.

Experiment 1

This experiment tried manufacture of a piezoelectric ceramic from a piezoelectric ceramic composition that possessed a composition corresponding to a solid solution having sodium bismuth titanate (NBT) as a first compound, potassium bismuth titanate (KBT) as a second compound, and iron-bismuth tungstate (BFW) as a third compound. The third compound was a compound oxide having Bi as a first component element, Fe as a second element, and W as a third component element.

As the raw materials for these compounds, powdered bismuth oxide, powdered sodium carbonate, powdered potassium carbonate, powdered titanium oxide, powdered iron oxide, and powdered tungsten oxide were prepared, thoroughly dried at a temperature exceeding 100° C., and weighed in conformity with a specified composition. Then, the weighed starting raw materials were mixed by means of a ball mill in water for about 16 hours, thoroughly dried, pressed in an expected shape, and calcined at 850° C. for about 2 hours. Subsequently, the product of this calcinations was pulverized by means of a ball mill in water for about 16 hours, then dried again, made to add polyvinyl alcohol (PVA) as a binder, and subjected to size enlargement.

Thereafter, the product of this size enlargement was shaped into like pellets measuring 17 mm in diameter and 1.5 mm in thickness, subjected to a heat treatment carried out at 700° C. for 2 hours for the purpose of volatilizing the binder, and subjected to main firing at 1050° C. for 2 hours. As the conditions of this firing, the rate of temperature increase and the rate of temperature decrease were both set at 200° C./hour. Then, the product of this firing was polished into a plane-parallel plate measuring about 0.4 mm to 0.6 mm in thickness and coated with silver paste by baking at 600° C. to 700° C. to form an electrode. It was further subjected to a polarizing treatment in silicon oil kept at 50° C. to 150° C. by application of an electric field of 10 MV/m for 15 minutes.

In accordance with the procedure of manufacture described above, Sample 1-1 to Sample 1-68 were manufactured by setting the compounding ratios of starting raw materials so that the compositions [the molar ratios of KBT, NBT, and BFW (mol % herein)] converted to the individual compounds in the piezoelectric ceramic composition (piezoelectric ceramic) subsequent to firing would assume the values shown in Table 1-1 and Table 1-2. In the foregoing compositions, $(Na_{0.5}Bi_{0.5})_{0.99}TiO_3$ was used as NBT, $(K_{0.5}Bi_{0.5})_{0.99}TiO_3$ as KBT, and $Bi(Fe_{3/4}W_{1/4})O_3$ as KBT. In NBT and KBT and the combination thereof, the condition A/B ratio=0.99 was invariably satisfied. In Table 1, Sample 1-1 to Sample 1-12 that had attached a * mark did not contain iron•bismuth tungstate (BFW), namely a third compound, and corresponded to comparative examples.

The Sample 1-1 to the Sample 1-68 consequently obtained were tested for specific conductivity ∈d, coefficient kr of electromechanical coupling in the spreading angle, and d33. The specific conductivity ∈d was determined with a LCR meter (made by Hewlett Packard Co. and sold under the product code "HP4284A") and the coefficient kr of electromechanical coupling was determined by the resonance-antiresonance method with an automatic measuring device using an impedance analyzer (made by Hewlett Packard Co. and sold under the product code of "HP4194A") and a desk-top computer. The d33 was determined with a d33 meter (made by Voice Research Laboratory of Chinese Science Agency and sold under the product code of "d33 meter"). The results of determination of the compositions (compositions converted into the individual compounds: mol %) and the individual properties of the manufactured piezoelectric ceramics are additionally shown in Table 1-1 and Table 1-2.

TABLE 1-1

| Sample No. | KBT | NBT | BFW | ∈d | kr(%) | d33(pC/N) |
|---|---|---|---|---|---|---|
| *1-1 | 8 | 92 | 0 | 383 | 12.0 | 76 |
| *1-2 | 9 | 91 | 0 | 401 | 14.5 | 80 |
| *1-3 | 10 | 90 | 0 | 445 | 17.3 | 84 |
| *1-4 | 11 | 89 | 0 | 483 | 19.3 | 88 |
| *1-5 | 12 | 88 | 0 | 524 | 22.5 | 94 |
| *1-6 | 13 | 87 | 0 | 542 | 25.2 | 100 |
| *1-7 | 14 | 86 | 0 | 588 | 27.5 | 107 |
| *1-8 | 16 | 84 | 0 | 696 | 30.7 | 122 |
| *1-9 | 18 | 82 | 0 | 819 | 31.8 | 135 |
| *1-10 | 20 | 80 | 0 | 1052 | 30.0 | 145 |
| *1-11 | 22 | 78 | 0 | 1324 | 18.4 | 80 |
| *1-12 | 23 | 77 | 0 | 1386 | 10.0 | 32 |
| 1-13 | 5 | 94 | 1 | 437 | 14.2 | 90 |
| 1-14 | 8 | 91 | 1 | 531 | 16.3 | 98 |
| 1-15 | 9 | 90 | 1 | 551 | 19.3 | 102 |
| 1-16 | 10 | 89 | 1 | 572 | 21.2 | 107 |
| 1-17 | 11 | 88 | 1 | 623 | 23.0 | 111 |
| 1-18 | 12 | 87 | 1 | 645 | 25.4 | 115 |
| 1-19 | 13 | 86 | 1 | 696 | 26.8 | 122 |
| 1-20 | 14 | 85 | 1 | 736 | 29.1 | 128 |
| 1-21 | 16 | 83 | 1 | 841 | 31.4 | 144 |
| 1-22 | 18 | 81 | 1 | 989 | 32.2 | 185 |
| 1-23 | 20 | 79 | 1 | 1250 | 31.0 | 175 |
| 1-24 | 22 | 77 | 1 | 1441 | 19.8 | 159 |
| 1-25 | 23 | 76 | 1 | 1560 | 17.7 | 148 |
| 1-26 | 24 | 75 | 1 | 1737 | 15.6 | 57 |
| 1-27 | 5 | 92 | 3 | 645 | 11.2 | 109 |
| 1-28 | 8 | 89 | 3 | 784 | 13.1 | 119 |
| 1-29 | 9 | 88 | 3 | 814 | 15.8 | 124 |
| 1-30 | 10 | 87 | 3 | 844 | 18.9 | 129 |
| 1-31 | 11 | 86 | 3 | 920 | 20.9 | 134 |
| 1-32 | 12 | 85 | 3 | 952 | 25.0 | 140 |
| 1-33 | 13 | 84 | 3 | 994 | 27.5 | 147 |
| 1-34 | 14 | 83 | 3 | 1013 | 29.7 | 149 |
| 1-35 | 16 | 81 | 3 | 1241 | 31.8 | 175 |
| 1-36 | 18 | 79 | 3 | 1450 | 33.1 | 179 |
| 1-37 | 20 | 77 | 3 | 2060 | 32.2 | 159 |
| 1-38 | 22 | 75 | 3 | 1982 | 20.6 | 155 |
| 1-39 | 23 | 74 | 3 | 1863 | 18.3 | 112 |
| 1-40 | 24 | 73 | 3 | 1744 | 16.1 | 69 |

TABLE 1-2

| Sample No. | KBT | NBT | BFW | ∈d | kr(%) | d33(pC/N) |
|---|---|---|---|---|---|---|
| 1-41 | 5 | 90 | 5 | 994 | 10.9 | 90 |
| 1-42 | 8 | 87 | 5 | 1207 | 12.8 | 98 |
| 1-43 | 9 | 86 | 5 | 1254 | 15.5 | 102 |
| 1-44 | 10 | 85 | 5 | 1301 | 18.5 | 107 |
| 1-45 | 11 | 84 | 5 | 1418 | 20.4 | 111 |
| 1-46 | 12 | 83 | 5 | 1467 | 24.4 | 115 |
| 1-47 | 13 | 82 | 5 | 1498 | 26.9 | 122 |
| 1-48 | 14 | 81 | 5 | 1561 | 29.0 | 128 |
| 1-49 | 16 | 79 | 5 | 1912 | 31.0 | 144 |
| 1-50 | 18 | 77 | 5 | 2234 | 32.3 | 178 |
| 1-51 | 20 | 75 | 5 | 2307 | 31.4 | 175 |
| 1-52 | 22 | 73 | 5 | 2404 | 20.1 | 159 |
| 1-53 | 23 | 72 | 5 | 2167 | 18.1 | 148 |
| 1-54 | 24 | 71 | 5 | 1930 | 16.0 | 57 |

TABLE 1-2-continued

| Sample No. | KBT | NBT | BFW | ∈d | kr(%) | d33(pC/N) |
|---|---|---|---|---|---|---|
| 1-55 | 5 | 89 | 6 | 1039 | 9.1 | 72 |
| 1-56 | 8 | 86 | 6 | 1199 | 10.7 | 81 |
| 1-57 | 9 | 85 | 6 | 1245 | 12.9 | 84 |
| 1-58 | 10 | 84 | 6 | 1291 | 15.4 | 88 |
| 1-59 | 11 | 83 | 6 | 1407 | 17.0 | 91 |
| 1-60 | 12 | 82 | 6 | 1456 | 20.4 | 95 |
| 1-61 | 13 | 81 | 6 | 1484 | 22.5 | 100 |
| 1-62 | 14 | 80 | 6 | 1549 | 24.2 | 101 |
| 1-63 | 16 | 78 | 6 | 1898 | 25.9 | 118 |
| 1-64 | 18 | 76 | 6 | 1869 | 27.0 | 140 |
| 1-65 | 20 | 74 | 6 | 1851 | 26.3 | 130 |
| 1-66 | 22 | 72 | 6 | 1880 | 16.8 | 76 |
| 1-67 | 23 | 71 | 6 | 1849 | 15.2 | 66 |
| 1-68 | 24 | 70 | 6 | 1819 | 13.7 | 56 |

It is clear from Tables 1-1 and 1-2 that the Samples (Sample 1-13 to Sample 1-68: corresponding to working examples) containing a third compound had the individual characteristic properties thereof improved as compared with the comparative examples (Sample 1-1 to Sample 1-12) containing no third compound. The present experiment obtained excellent piezoelectric properties despite low-temperature firing performed at 1050° C. for 2 hours.

Degradation of the individual characteristic properties, however, appeared in Sample -13 having the molar ratio of the first compound (NBT) exceed 0.91 (91 mol %), Samples 1-27 and 1-41 having the molar ratio of the second compound (KBT) fall short of 0.08 (8 mol %), Samples 1-26, 1-40, and 1-54 having the molar ratio of the second compound (KBT) exceed 0.23 (23 mol %), and Samples 1-55 to 1-68 having the molar ratio of the third compound (BFW) exceed 0.05 (5 mol %). It is plain, therefore, that the NBT-KBT-BFW-based piezoelectric ceramic compositions, therefore, were preferred to satisfy the conditions, $0.76 \leq x \leq 0.91$, $0.08 \leq y \leq 0.23$, $0 < z \leq 0.05$, and $x+y+y=1$ with respect to the molar ratio x of NBT, the molar ratio y of KBT, and the molar ratio z of BFW.

Experiment 2

Piezoelectric ceramics (Samples 2-1 and 2-2) were manufactured by following the procedure of Experiment 1 excepting use of iron-bismuth molybdate (BFM) (having Mo, a hexavalent metallic element, as a third component element) as a third compound in the place of iron-bismuth tungstate (BFW). Further, the manufactured piezoelectric ceramics were tested for specific conductivity ∈d, coefficient kr of electromechanical coupling in the spreading angle, and d33 by following the procedure of Experiment 1. The results of determination of the compositions (compositions converted into individual compounds: mol %) and the characteristic properties of the manufactured piezoelectric ceramics are shown in Table 2.

TABLE 2

| Sample No. | KBT | NBT | BMW | ∈d | kr(%) | d33(pC/N) |
|---|---|---|---|---|---|---|
| 2-1 | 18 | 81 | 1 | 984 | 32.3 | 171 |
| 2-2 | 18 | 77 | 5 | 2224 | 32.5 | 165 |

The samples using BFM as a third compound showed vast improvements of characteristic properties as compared with Sample 1-9 that had an equal composition to NBT and KBT and did not contain a third compound (BFW or BFM).

Experiment 3

In this experiment, piezoelectric ceramics (Samples 3-1 to 3-7)) were manufactured by following the procedure of Experiment 1 excepting variations of A/B ratios of NBT and KBT. Similarly, as regards the case of containing no BFW, piezoelectric ceramics (Samples 3-8 to 3-12: corresponding to comparative examples) were manufactured by following the procedure of Experiment 1 excepting variation of A/B ratios of NBT and KBT. Incidentally, though the A/B ratios were the values pertaining to NBT and KBT, the combination of NBT and KBT also had the same A/B ratio because the A/B ratios of NBT and KBT had equal values.

The manufactured piezoelectric ceramics were tested for specific conductivity ∈d, coefficient kr of electromechanical coupling in the spreading angle, and d33 by following the procedure of Experiment 1. The results of determination of the compositions (compositions converted to the individual compounds: mol %), the overall A/B ratios of the first compound and the second compound, and the characteristic properties of the manufactured piezoelectric ceramics are shown in Table 3.

TABLE 3

| Sample No. | KBT | NBT | BFW | A/B | ∈d | kr(%) | d33(pC/N) |
|---|---|---|---|---|---|---|---|
| 3-1 | 18 | 81 | 1 | 1.01 | 883 | 20.9 | 107 |
| 3-2 | 18 | 81 | 1 | 1 | 910 | 31.7 | 170 |
| 3-3 | 18 | 81 | 1 | 0.99 | 989 | 32.2 | 185 |
| 3-4 | 18 | 81 | 1 | 0.95 | 952 | 30.6 | 170 |
| 3-5 | 18 | 81 | 1 | 0.9 | 870 | 29.3 | 154 |
| 3-6 | 18 | 81 | 1 | 0.85 | 801 | 25.7 | 131 |
| 3-7 | 18 | 81 | 1 | 0.8 | 791 | 23.1 | 105 |
| *3-8 | 18 | 82 | 0 | 1 | 755 | 29.5 | 124 |
| *3-9 | 18 | 82 | 0 | 0.99 | 819 | 31.8 | 135 |
| *3-10 | 18 | 82 | 0 | 0.95 | 789 | 29.2 | 124 |
| *3-11 | 18 | 82 | 0 | 0.9 | 721 | 26.9 | 112 |
| *3-12 | 18 | 82 | 0 | 0.85 | 664 | 23.4 | 96 |

The Samples 3-1 to 3-7 containing BFW invariably showed improvements of piezoelectric properties as compared with the comparative examples (Samples 3-8 to 3-12) containing no BFW. By making the overall A/B ratios of the first compound and the second compound fall short of 1, the coefficients kr of electromechanical coupling and the piezoelectric constants d33 were conspicuously improved.

In contrast, when the aforementioned A/B ratios were made to exceed 1, the coefficients kr of electromechanical coupling and the piezoelectric constants d33 showed degradations. This fact may be logically explained by supposing that when the aforementioned A/B ratios exceeded 1, the produced piezoelectric ceramics showed degraded sintering properties, failed to improve density, and allowed no application of high voltage during the course of polarization. On the other hand, when the aforementioned A/B ratios were 0.8, the relevant samples showed degradations of the coefficients kr of electromechanical coupling and the piezoelectric constants d33. This fact may be logically explained by supposing that when the aforementioned A/B ratios were unduly small, Ti as a B site element was left behind abundantly to an extent of inducing formation of a heterogeneous phase. The formation of a heterogeneous phase led to degradation of piezoelectric properties.

It is confirmed by the foregoing results of experiment that such piezoelectric properties as displacement were further improved by satisfying the condition $0.85 \leq (\alpha \cdot s + \beta \cdot t) \leq 1$ providing the molar ratio of the first compound was denoted by α, the molar ratio of the second compound by β, and the A/B ratio by t (wherein $\alpha + \beta = 1$).

Experiment 4

In this experiment, piezoelectric ceramics were manufactured by following the procedure of Experiment 1 excepting use of barium titanate (BT) instead as a second compound and the manufactured piezoelectric ceramics were tested for specific conductivity ∈d, coefficient kr of electromechanical coupling in the spreading angle, and d33 by following the procedure of Experiment 1. The results of determination of the compositions (compositions converted to individual compounds: mol %) and the characteristic properties of the manufactured piezoelectric ceramics are shown in Table 4.

TABLE 4

| Sample No. | NBT | BT | BFW | ∈d | kr(%) | d33(pC/N) |
|---|---|---|---|---|---|---|
| 4-1 | 94 | 5 | 1 | 979 | 32.0 | 154 |
| 4-2 | 92 | 5 | 3 | 1021 | 31.9 | 161 |
| 4-3 | 90 | 5 | 5 | 870 | 29.1 | 134 |
| 4-4 | 89 | 5 | 6 | 802 | 23.6 | 104 |
| 4-5 | 94 | 5 | 1 | 1040 | 31.4 | 159 |
| 4-6 | 92 | 5 | 3 | 1084 | 31.3 | 165 |
| 4-7 | 90 | 5 | 5 | 924 | 28.5 | 138 |
| 4-8 | 89 | 5 | 6 | 851 | 23.2 | 107 |
| 4-9 | 89 | 10 | 1 | 1103 | 30.8 | 165 |
| 4-10 | 87 | 10 | 3 | 1149 | 30.7 | 172 |
| 4-11 | 85 | 10 | 5 | 979 | 27.9 | 144 |
| 4-12 | 84 | 10 | 6 | 902 | 22.8 | 111 |
| *4-13 | 95 | 5 | 0 | 955 | 25.9 | 114 |
| *4-14 | 90 | 10 | 0 | 1015 | 24.7 | 120 |

Even when BT was used as a second compound, the Samples 4-1 to 4-12 containing BFW showed improvements of piezoelectric properties as compared with the Samples 4-13 and 4-14 (corresponding to comparative examples) containing no BFW. Since the Samples 4-4, 4-8, and 4-12 that contained BFW in amounts in excess of 5 mol % showed degradations of piezoelectric properties, satisfaction of the conditions $0.85 \leq x \leq 0.99$, $0 < y \leq 0.10$, and $0 < z \leq 0.05$ as regards the molar ratio x of NBT, the molar ratio y of BT, and the molar ratio z of BFW might be concluded favorable.

Experiment 5

Piezoelectric ceramics (Samples 5-1 to 5-68) were manufactured by following the procedure of Experiment 1 excepting use of manganese-bismuth tungstate (BMW) as a third compound in the place of iron-bismuth tungstate (BFW). The third compound was a compound oxide having Bi as a first component element, Mn as a second component element, and W as a third component element. Incidentally, of the samples mentioned above, the Samples 5-1 to 5-12 (the samples having attached a * mark) did not contain BMW as the third compound and, therefore, corresponded to comparative examples.

The manufactured piezoelectric ceramics were tested for specific conductivity ∈d, coefficient kr of electromechanical coupling in the spreading angle, and d33 by following the procedure of Experiment 1. The results of determination of the compositions (compositions converted to the individual compounds: mol %) and the characteristic properties of the manufactured piezoelectric ceramics are shown in Tables 5-1 and 5-2.

TABLE 5-1

| Sample No. | KBT | NBT | BMW | ∈d | kr(%) | d33(pC/N) |
|---|---|---|---|---|---|---|
| *5-1 | 8 | 92 | 0 | 383 | 12.0 | 76 |
| *5-2 | 9 | 91 | 0 | 401 | 14.5 | 80 |
| *5-3 | 10 | 90 | 0 | 445 | 17.3 | 84 |
| *5-4 | 11 | 89 | 0 | 483 | 19.3 | 88 |
| *5-5 | 12 | 88 | 0 | 524 | 22.5 | 94 |
| *5-6 | 13 | 87 | 0 | 542 | 25.2 | 100 |
| *5-7 | 14 | 86 | 0 | 588 | 27.5 | 107 |
| *5-8 | 16 | 84 | 0 | 696 | 30.7 | 122 |
| *5-9 | 18 | 82 | 0 | 819 | 31.8 | 135 |
| *5-10 | 20 | 80 | 0 | 1052 | 30.0 | 145 |
| *5-11 | 22 | 78 | 0 | 1324 | 18.4 | 80 |
| *5-12 | 23 | 77 | 0 | 1386 | 10.0 | 32 |
| 5-13 | 5 | 94 | 1 | 413 | 14.3 | 89 |
| 5-14 | 8 | 91 | 1 | 501 | 17.0 | 97 |
| 5-15 | 9 | 90 | 1 | 520 | 20.0 | 102 |
| 5-16 | 10 | 89 | 1 | 540 | 22.0 | 106 |
| 5-17 | 11 | 88 | 1 | 588 | 23.9 | 110 |
| 5-18 | 12 | 87 | 1 | 609 | 26.4 | 114 |
| 5-19 | 13 | 86 | 1 | 657 | 27.9 | 121 |
| 5-20 | 14 | 85 | 1 | 695 | 29.4 | 127 |
| 5-21 | 16 | 83 | 1 | 787 | 31.6 | 142 |
| 5-22 | 18 | 81 | 1 | 932 | 32.4 | 162 |
| 5-23 | 20 | 79 | 1 | 1232 | 31.2 | 162 |
| 5-24 | 22 | 77 | 1 | 1420 | 20.0 | 147 |
| 5-25 | 23 | 76 | 1 | 1538 | 17.9 | 137 |
| 5-26 | 24 | 75 | 1 | 1711 | 15.8 | 52 |
| 5-27 | 5 | 92 | 3 | 609 | 11.2 | 86 |
| 5-28 | 8 | 89 | 3 | 740 | 13.6 | 94 |
| 5-29 | 9 | 88 | 3 | 768 | 16.5 | 99 |
| 5-30 | 10 | 87 | 3 | 797 | 19.6 | 103 |
| 5-31 | 11 | 86 | 3 | 868 | 21.7 | 107 |
| 5-32 | 12 | 85 | 3 | 899 | 26.0 | 111 |
| 5-33 | 13 | 84 | 3 | 938 | 28.6 | 127 |
| 5-34 | 14 | 83 | 3 | 956 | 29.9 | 129 |
| 5-35 | 16 | 81 | 3 | 1162 | 32.0 | 148 |
| 5-36 | 18 | 79 | 3 | 1368 | 33.4 | 153 |
| 5-37 | 20 | 77 | 3 | 2030 | 32.4 | 128 |
| 5-38 | 22 | 75 | 3 | 1953 | 20.8 | 115 |
| 5-39 | 23 | 74 | 3 | 1836 | 18.5 | 83 |
| 5-40 | 24 | 73 | 3 | 1718 | 16.3 | 50 |

TABLE 5-2

| Sample No. | KBT | NBT | BMW | ∈d | kr(%) | d33(pC/N) |
|---|---|---|---|---|---|---|
| 5-41 | 5 | 90 | 5 | 939 | 11.2 | 83 |
| 5-42 | 8 | 87 | 5 | 1140 | 13.6 | 96 |
| 5-43 | 9 | 86 | 5 | 1184 | 16.4 | 100 |
| 5-44 | 10 | 85 | 5 | 1228 | 19.5 | 104 |
| 5-45 | 11 | 84 | 5 | 1338 | 21.6 | 109 |
| 5-46 | 12 | 83 | 5 | 1385 | 25.9 | 113 |
| 5-47 | 13 | 82 | 5 | 1413 | 28.5 | 114 |
| 5-48 | 14 | 81 | 5 | 1473 | 29.8 | 116 |
| 5-49 | 16 | 79 | 5 | 1791 | 31.9 | 135 |
| 5-50 | 18 | 77 | 5 | 2107 | 33.2 | 151 |
| 5-51 | 20 | 75 | 5 | 2273 | 32.3 | 115 |
| 5-52 | 22 | 73 | 5 | 2369 | 20.7 | 112 |
| 5-53 | 23 | 72 | 5 | 2135 | 18.6 | 79 |
| 5-54 | 24 | 71 | 5 | 1901 | 16.5 | 46 |
| 5-55 | 5 | 89 | 6 | 980 | 9.2 | 72 |
| 5-56 | 8 | 86 | 6 | 1131 | 11.1 | 80 |
| 5-57 | 9 | 85 | 6 | 1175 | 13.4 | 83 |
| 5-58 | 10 | 84 | 6 | 1219 | 16.0 | 87 |
| 5-59 | 11 | 83 | 6 | 1328 | 17.7 | 90 |
| 5-60 | 12 | 82 | 6 | 1375 | 21.2 | 94 |
| 5-61 | 13 | 81 | 6 | 1401 | 23.4 | 99 |
| 5-62 | 14 | 80 | 6 | 1462 | 24.4 | 100 |
| 5-63 | 16 | 78 | 6 | 1778 | 26.1 | 117 |
| 5-64 | 18 | 76 | 6 | 1763 | 27.2 | 130 |
| 5-65 | 20 | 74 | 6 | 1824 | 26.5 | 120 |
| 5-66 | 22 | 72 | 6 | 1853 | 16.9 | 70 |
| 5-67 | 23 | 71 | 6 | 1823 | 15.4 | 61 |
| 5-68 | 24 | 70 | 6 | 1792 | 13.9 | 51 |

Even when BMW was used as a third compound, the Samples 5-13 to 5-68 containing BMW showed improvements of piezoelectric properties as compared with the Samples 5-1 to 5-12 containing no BMW. Degradations of individual characteristic properties, however, appeared in the Sample 5-13 having the molar ratio of the first compound (NBT) exceed 0.91 (91 mol %), the Samples 5-27 and 5-41 having the molar ratios of the second compound (KBT) fall short of 0.08 (8 mol %), the Samples 5-26, 5-40, and 5-54 having the molar ratios of the second compound (KBT) exceed 0.23 (23 mol %), and the Samples 5-55 to 5-68 having the molar ratios of the third compound (BMW) exceed 0.05 (5 mol %). Even the NBT-KBT-BMW-based piezoelectric compositions, therefore, were preferred to satisfy the conditions $0.76 \leq x \leq 0.91$, $0.08 \leq y \leq 0.23$, $0 < z \leq 0.05$, and $x+y+z=1$ as regards the molar ratio z of NBT, the molar ratio y of KBT, and the molar ratio z of BMW.

Experiment 6

Piezoelectric ceramics (Samples 6-1 and 6-2) were manufactured by following the procedure of Experiment 5 excepting use of manganese-bismuth molybdate (BMM) (having Mo, a hexavalent metallic element, as a third component element) in the place of manganese-bismuth tungstate (BMW). Further, the manufactured piezoelectric ceramics were tested for specific conductivity $\in d$, coefficient kr of electromechanical coupling in the spreading angle, and d33 by following the procedure of Experiment 1. The results of determination of the compositions (compositions converted to the individual compounds: mol %) and the characteristic properties of the manufactured piezoelectric ceramics are shown in Table 6.

TABLE 6

| Sample No. | KBT | NBT | BMM | $\in d$ | kr(%) | d33(pC/N) |
|---|---|---|---|---|---|---|
| 6-1 | 18 | 81 | 1 | 928 | 32.5 | 150 |
| 6-2 | 18 | 77 | 5 | 2097 | 33.3 | 140 |

Even when BMM was used as a third compound, the samples using this third compound showed vast improvements of characteristic properties as compared with the Sample 5-9 that contained no third compound (BMW or BMM) equaled in composition to NBT or KBT.

Experiment 7

In this experiment, piezoelectric ceramics (Samples 7-1 to 7-7) were manufactured by following the procedure of Experiment 5 excepting variation of the A/B ratios of NBT and KBT. While the A/B ratios were the values relating to NBT and KBT, the combination of NBT and KBT had the same A/B ratio because the A/B ratios of NBT and KBT had equal values.

The manufactured piezoelectric ceramics were tested for specific conductivity $\in d$, coefficient kr of electromechanical coupling in the spreading angle, and d33 by following the procedure of Experiment 1. The results of determination of the compositions (compositions converted to the individual compounds: mol %), the overall A/B ratios of the first compound and the second compound, and the characteristic properties of the manufactured piezoelectric ceramics are shown in Table 7.

TABLE 7

| Sample No. | KBT | NBT | BMW | A/B | $\in d$ | kr(%) | d33(pC/N) |
|---|---|---|---|---|---|---|---|
| 7-1 | 18 | 81 | 1 | 1.01 | 833 | 21.1 | 94 |
| 7-2 | 18 | 81 | 1 | 1 | 869 | 32.0 | 149 |
| 7-3 | 18 | 81 | 1 | 0.99 | 932 | 32.4 | 162 |
| 7-4 | 18 | 81 | 1 | 0.95 | 908 | 30.8 | 149 |
| 7-5 | 18 | 81 | 1 | 0.9 | 831 | 29.5 | 134 |
| 7-6 | 18 | 81 | 1 | 0.85 | 765 | 25.9 | 115 |
| 7-7 | 18 | 81 | 1 | 0.8 | 747 | 23.3 | 92 |

It is clear from Table 7 that improvements in coefficient kr of electromechanical coupling and piezoelectric constant d33 appeared in consequence of having the overall A/B ratio of the first compound and the second compound fall short of 1. In contrast, degradations of coefficient kr of electromechanical coupling and piezoelectric constant d33 appeared when the A/B ratio mentioned above exceeded 1. This fact may be logically explained by supposing that when the aforementioned A/B ratio exceeded 1, the excess degraded the sintering property of a piezoelectric ceramic, allowed no improvement of density, and caused failure to apply high voltage during the course of polarization. In contrast, when the aforementioned A/B ratio was 0.8, degradations appeared in both the coefficient kr of electromechanical coupling and the piezoelectric constant d33. This fact may be logically explained by supposing that undue decreases of the aforementioned A/B ratio induced large surpluses of Ti, a B site component, and caused formation of a heterogeneous phase. The formation of the heterogeneous phase led to degrading piezoelectric properties.

The results of experiment described above confirm that such piezoelectric properties as displacement were improved to a greater extent by causing the condition $0.85 \leq (\alpha \cdot s + \beta \cdot t) \leq 1$ to be satisfied providing the molar ratio of the first compound was denoted by $\alpha$, the molar ratio of the second compound by $\beta$, and the A/B ratio by t (wherein $\alpha + \beta = 1$).

Experiment 8

In this experiment, piezoelectric ceramics were manufactured by following the procedure of Experiment 5 excepting use of barium titanate (BT) instead as a second compound and the manufactured piezoelectric ceramics were tested for specific conductivity $\in d$, coefficient kr of electromechanical coupling in the spreading angle, and d33 by following the procedure of Experiment 1. The results of determination of the compositions (compositions converted to the individual compounds: mol %) and the characteristic properties of the manufactured piezoelectric ceramics are shown in Table 8.

TABLE 8

| Sample No. | NBT | BT | BMW | $\in d$ | kr(%) | d33(pC/N) |
|---|---|---|---|---|---|---|
| 8-1 | 94 | 1 | 1 | 793 | 33.4 | 147 |
| 8-2 | 92 | 1 | 3 | 827 | 33.2 | 153 |
| 8-3 | 90 | 1 | 5 | 705 | 30.3 | 128 |
| 8-4 | 89 | 1 | 6 | 650 | 24.6 | 98 |
| 8-5 | 94 | 5 | 1 | 842 | 32.7 | 153 |
| 8-6 | 92 | 5 | 3 | 878 | 32.6 | 159 |
| 8-7 | 90 | 5 | 5 | 748 | 29.7 | 133 |
| 8-8 | 89 | 5 | 6 | 690 | 24.1 | 102 |
| 8-9 | 89 | 10 | 1 | 893 | 32.0 | 159 |
| 8-10 | 87 | 10 | 3 | 931 | 31.9 | 165 |
| 8-11 | 85 | 10 | 5 | 793 | 29.0 | 138 |
| 8-12 | 84 | 10 | 6 | 731 | 23.7 | 107 |

Even when BT was used as a second compound, the Samples 8-1 to 8-12 containing BMW showed improvements of piezoelectric properties as compared with the samples (foregoing Samples 4-13 and 4-14: corresponding to comparative examples) containing no BMW.

Comparative Experiment

A piezoelectric ceramic was manufactured similarly to each of the preceding experiments excepting use of NBT as a first compound, BT as a second compound, and iron-bismuth niobate (BFN) as a third compound. This piezoelectric ceramic was composed of 81 mol % of NBT, 18 mol % of BT, and 1 mol % of BFN.

When the piezoelectric ceramic was subjected to main firing at 1050° C. for 2 hours similarly to each of the preceding experiments, the piezoelectric ceramic consequently obtained showed specific conductivity $\in d=700$, coefficient kr of electromechanical coupling=23.5(%), and d33=105 (pC/

N). Thus, it was ascertained that no adequate characteristic properties were obtained by firing at a low temperature when iron-bismuth niobate (BFN) proposed by the conventional technique was used as a third compound.

What is claimed is:

1. A piezoelectric ceramic composition characterized by containing elements constituting a composition corresponding to a solid solution composed of a first compound possessing a rhombohedral crystal-based perovskite structure, a second compound possessing a tetragonal crystal-based perovskite structure, and a third compound that is a compound oxide containing Bi as a first component element, at least one kind selected from Fe and Mn as a second component element, and a hexavalent metallic element as a third component element.

2. A piezoelectric ceramic composition according to claim 1, wherein said hexavalent metallic element is at least one kind selected from W and Mo.

3. A piezoelectric ceramic composition according to claim 1, wherein said first compound is sodium bismuth titanate.

4. A piezoelectric ceramic composition according to claim 1, wherein said second compound is potassium bismuth titanate.

5. A piezoelectric ceramic composition according to claim 4, wherein said composition satisfies $0.76 \leq x \leq 0.91$, $0.08 \leq y \leq 0.23$, $0 < z \leq 0.05$, and $x+y+z=1$ providing said composition is converted by having the molar ratio of said first compound denoted by x, the molar ratio of said second compound by y, and the molar ratio of said third compound by z.

6. A piezoelectric ceramic composition according to claim 1, wherein said second compound is barium titanate.

7. A piezoelectric ceramic composition according to claim 6, wherein said composition satisfies $0.85 \leq x \leq 0.99$, $0 < y \leq 0.10$, $0 < z \leq 0.05$, and $x+y+z=1$ providing said composition is converted by having the molar ratio of said first compound denoted by x, the molar ratio of said second compound by y, and the molar ratio of said third compound by z.

* * * * *